(12) United States Patent
Childress et al.

(10) Patent No.: US 6,631,055 B2
(45) Date of Patent: Oct. 7, 2003

(54) TUNNEL VALVE FLUX GUIDE STRUCTURE FORMED BY OXIDATION OF PINNED LAYER

(75) Inventors: Jeffrey R. Childress, San Jose, CA (US); Robert E. Fontana, San Jose, CA (US); Kuok San Ho, Cupertino, CA (US); Ching H. Tsang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 09/877,358

(22) Filed: Jun. 8, 2001

(65) Prior Publication Data

US 2002/0186514 A1 Dec. 12, 2002

(51) Int. Cl.⁷ ................................................. G11B 5/39
(52) U.S. Cl. ...................................................... 360/321
(58) Field of Search ................................. 360/321, 324, 360/324.1, 324.12, 324.2, 313

(56) References Cited

U.S. PATENT DOCUMENTS

| | | | |
|---|---|---|---|
| 5,898,547 A | 4/1999 | Fontana, Jr. et al. | 360/113 |
| 6,185,079 B1 * | 2/2001 | Gill | 360/324.2 |
| 6,344,954 B1 * | 2/2002 | Redon et al. | 360/324.2 |
| 6,438,026 B2 * | 8/2002 | Gillies et al. | 365/158 |
| 6,486,662 B1 * | 11/2002 | Ruigrok et al. | 324/252 |

* cited by examiner

Primary Examiner—William Korzuch
Assistant Examiner—Angel Castro
(74) Attorney, Agent, or Firm—Lumen Intellectual Property Services, Inc.

(57) ABSTRACT

A flux guided magnetic tunnel junction head includes a ferromagnetic pinned layer having an active region with a front edge recessed from a sensing surface, and a non-active region located between the sensing surface and the active region. The non-active region of the ferromagnetic pinned layer is rendered substantially non-conducting by chemically processing the ferromagnetic material of the ferromagnetic pinned layer in this region. The flux guided MTJ head also includes a ferromagnetic free layer having a front edge substantially coplanar with a sensing surface. The ferromagnetic free layer can function as a flux guide to direct magnetic flux from a recording medium to the tunnel junction. The location of the front edge of the ferromagnetic pinned layer prevents any shorting of the flux guided MTJ head occurring when the head is lapped at the sensing surface.

29 Claims, 11 Drawing Sheets

TUNNEL VALVE FLUX GUIDE STRUCTURE FORMED BY OXIDATION OF PINNED LAYER

FIELD OF THE INVENTION

This invention relates generally to magnetic tunnel junction (MTJ) read heads. More particularly, it relates to a magnetic tunnel junction head in which the ferromagnetic free layer functions as a flux guide.

BACKGROUND ART

Magnetic tunnel junction (MTJ) devices are based on the phenomenon of spin-polarized electron tunneling. A typical MTJ device includes two ferromagnetic layers separated by a thin insulating tunnel barrier layer. One of the ferromagnetic layers has a magnetic moment free to rotate in the presence of applied magnetic fields. The other ferromagnetic layer has a magnetic moment fixed by interfacial exchange coupling with an anti-ferromagnetic layer. The insulating tunnel barrier layer is thin enough that quantum mechanical tunneling of electrons can occur between the ferromagnetic layers. The tunneling phenomenon is electron-spin dependent, making the magnetic response of the MTJ a function of the relative orientations and spin polarizations of the two ferromagnetic layers.

MTJ devices have been proposed primarily as memory cells for solid state memory devices. The state of the MTJ memory cell is determined by measuring the resistance of the MTJ when a sense current is passed perpendicularly through the MTJ from one ferromagnetic layer to the other. The probability of tunneling of charge carriers across the insulating tunnel barrier layer depends on the relative alignment of the magnetic moments (magnetization directions) of two ferromagnetic layers. The tunneling current is spin polarized, which means that the electrical current passing from one of the ferromagnetic layers, for example, the layer whose magnetic moment is fixed, is predominantly composed of electrons of one spin type (spin up or spin down, depending on the orientation of the magnetic moment of the ferromagnetic layer). The degree of spin polarization of the tunneling current is determined by the electronic band structure of the magnetic material at the interface of the ferromagnetic layer with the tunnel barrier layer. One ferromagnetic layer thus acts as a spin filter. The probability of tunneling of the charge carriers depends on the availability of electronic states of the same spin polarization as the spin polarization of the electrical current in the other ferromagnetic layer. Usually, when the magnetic moments of two ferromagnetic layers are parallel to each other, there are more available electronic states than when the magnetic moments of the two ferromagnetic layers are aligned anti-parallel to each other. Thus, the tunneling probability of the charge carriers is highest when the magnetic moments of both layers are parallel, and is lowest when the magnetic moments are antiparallel. When the moments are arranged neither parallel nor antiparallel, the tunneling probability takes on an intermediate value. Thus, the electrical resistance of MTJ memory cells depends on the spin polarization of the electrical current and the electronic states in both of the ferromagnetic layers.

MTJ devices have attracted more attention since a large tunneling magneto-resistance (TMR) was found at room temperature. MTJ devices have since been used as magneto-resistive read/write heads for magnetic recording. FIG. 1A is a sectional view of a MTJ head 100 of the prior art. MTJ head 100 includes a MTJ layered structure 120 sandwiched by a top lead 116 adjacent to a top shield 118 and a bottom lead 104 adjacent to a bottom shield 102. The MTJ layered structure 120 includes a ferromagnetic free layer 106, a ferromagnetic pinned layer 110, an insulating tunnel barrier layer 108 located between the ferromagnetic free layer 106 and the ferromagnetic pinned layer 110, an anti-ferromagnetic layer 112 adjacent to the ferromagnetic pinned layer 110, and a capping layer 114 adjacent to the anti-ferromagnetic layer 112. In the MTJ head 100, the ferromagnetic free layer 106, the insulating tunnel barrier layer 108, and the ferromagnetic pinned layer 110 all have their front edges exposed at the sensing surface 122 of the head, i.e., the air-bearing surface (ABS) of the air bearing slider if the MTJ head 100 is used in a magnetic recording disk drive. Unfortunately, when the MTJ head 100 is lapped to form the sensing surface 122, it is possible that material from the ferromagnetic free layer 106 and the ferromagnetic pinned layer 110 smears at the sensing surface 122 and shorts out across the insulating tunnel barrier layer 108.

Magnetoresistive (MR) head technology has been developed to produce a MTJ head for a magnetic recording system that does not suffer the problem associated with having the edges of the MTJ layers exposed at the sensing surface. FIG. 1B is a sectional view of a flux guided MTJ head 101 having the ferromagnetic free layer 105 acting as a flux guide to direct magnetic flux from the magnetic recording medium to the tunnel junction. The flux guided MTJ head 101 includes a MTJ layered structure including a ferromagnetic free layer 105, a ferromagnetic pinned layer 109, an insulating tunnel barrier layer 107 located between the ferromagnetic free layer 105 and the ferromagnetic pinned layer 109, an anti-ferromagnetic layer 111 adjacent to the ferromagnetic pinned layer 109, and a capping layer 113 adjacent to the anti-ferromagnetic layer 111. The MTJ layered structure is sandwiched by a bottom lead 103 adjacent to a bottom shield 121 and a top lead 115 adjacent to a top shield 117. In the flux guided MTJ head 101, the front edge of the ferromagnetic free layer 105 is exposed at the ABS 123, while the front edges of the capping layer 113, the anti-ferromagnetic layer 111, the ferromagnetic pinned layer 109, and the insulating tunnel barrier layer 107 are recessed from the ABS 123 by an insulation 119.

The flux guided MTJ 101 is fabricated using a method illustrated in FIGS. 2A–2D. As shown in FIG. 2A, an electrical lead 202 is first deposited on a substrate (not shown), and a ferromagnetic free layer 204 is deposited on the electrical lead 202. An insulating tunnel barrier layer 206 is deposited on the ferromagnetic free layer 204, and a ferromagnetic pinned layer 208 is deposited on the insulating tunnel barrier layer 206. An anti-ferromagnetic layer 210 is deposited on the ferromagnetic pinned layer 208, and a capping layer 212 is deposited on the anti-ferromagnetic layer 210. All of the MTJ layers are deposited by typical vacuum deposition techniques, such as ion beam deposition, RF or DC magnetron sputtering deposition, evaporation deposition, or molecular beam epitaxy (MBE) deposition. A photoresist mask 214 is deposited on the MTJ layers to define an active region of the ferromagnetic pinned layer 208. The material in the unmasked regions of the capping layer 212, the anti-ferromagnetic layer 210, the ferromagnetic pinned layer 208 and the insulating tunnel barrier layer 206 are removed as shown in FIG. 2B using subtractive techniques, such as ion beam milling, chemically-assisted ion milling, sputter etching, and reactive ion etching, preferably ion beam milling. These unmasked regions are then refilled with an insulating material 218 as shown in FIG. 2C with a quantity of the insulating material 218 also deposited onto the top and sidewalls of the photoresist mask 214. This quantity of the insulating material 218 is removed, along with the photoresist mask 214, in a liftoff process, resulting in a structure as shown in FIG. 2D.

A problem with subtractive techniques is that the endpoint must terminate precisely within the insulating tunnel barrier layer 206. This is very difficult to achieve. For example, if ion beam milling is used, the thickness of the insulating tunnel barrier layer 206 is typically about 10 Å, and the ion beam milling rates are typically between 3 Å/sec and 4 Å/sec, which allows an endpoint target about 2–3 seconds. Furthermore, if undermining occurs, a portion of the ferromagnetic pinned layer 208 still remains at the ABS, and shorting across the insulating tunnel barrier layer 206 can occur. If overmilling occurs, then the ferromagnetic free layer 204 is thinned or damaged, and its flux conducting efficiency is greatly reduced.

U.S. Pat. No. 5,898,547 issued to Fontana, Jr. et al. on Apr. 27, 1999, discloses a flux guided magnetic tunnel junction (MTJ) head and a method for making the head. Fontana's flux guided MTJ head is fabricated by a method different from the method described in FIGS. 2A–2D, in which the MTJ layers are deposited in a reverse order. First, a ferromagnetic pinned layer is deposited on an anti-ferromagnetic layer, and a tunnel barrier layer is deposited on the ferromagnetic pinned layer. Next, a photoresist mask is deposited on the tunnel barrier layer to define the active region. The material in the unmasked regions is removed by ion beam milling, and the unmasked region is then refilled with an insulating material. Finally, a ferromagnetic free layer is deposited on the tunnel barrier layer, and a top electrical lead is deposited on the ferromagnetic free layer to finish the flux guided MTJ head. However, this method is difficult to implement in manufacturing because ferromagnetic free layer is composed of two sublayers deposited by two different stages with the ion beam milling taking place between these two stages. The ion beam milling can potentially contaminate the first deposited sublayer. Therefore, the ferromagnetic free layer's integrity and thickness control may be compromised.

There is a need, therefore, for a flux guided MTJ head for recording system that overcomes the above difficulties.

SUMMARY

A flux guided magnetic tunnel junction (MTJ) head according to a first embodiment of the present invention includes a flux guided MTJ layered structure sandwiched by two electrically conductive leads, each of which is adjacent to a shield. The flux guided MTJ layered structure includes a ferromagnetic pinned layer, a ferromagnetic free layer, an insulating tunnel barrier layer located between the ferromagnetic free layer and the ferromagnetic pinned layer, and an anti-ferromagnetic layer in proximity to the ferromagnetic pinned layer.

The ferromagnetic free and the insulating tunnel barrier layers have front edges substantially coplanar with a sensing surface or air bearing surface (ABS).

In a preferred embodiment, the ferromagnetic pinned layer includes an active region having a front edge recessed from the ABS, and a non-active region located between the active region and the ABS. The non-active region of the ferromagnetic pinned layer is formed by chemical processing, such as oxidation, nitridization or fluorination, of the material in this region to render it non-conducting. The non-active region of the ferromagnetic pinned layer is substantially non-magnetic. Alternatively, the ferromagnetic pinned layer can include an anti-parallel (AP) pinned structure containing first and second ferromagnetic pinned layers sandwiching a metal spacer layer such as Ru layer. The first and second ferromagnetic pinned layers will anti-parallel to each other due to the anti-ferromagnetic coupling between the two layers through the metal spacer layer.

The flux guided MTJ layered structure further includes a capping layer adjacent to the anti-ferromagnetic layer. The capping layer has a front edge recessed from the sensing surface and substantially coplanar with the front edge of the active region of the ferromagnetic pinned layer. Furthermore, the flux guided MTJ layered structure includes a top electrically conductive lead adjacent to the capping layer. The top electrically conductive lead can have a front edge recessed from the sensing surface and substantially coplanar with the front edge of the active region of the ferromagnetic pinned layer.

The anti-ferromagnetic layer has a front edge recessed from the sensing surface and substantially coplanar with the front edge of the active region of the ferromagnetic pinned layer. Alternatively, the anti-ferromagnetic layer includes an active region having a front edge recessed from the ABS and substantially coplanar with the front edge of the active region of the ferromagnetic pinned layer, and a non-active region located between the active region and the ABS.

The flux guided MTJ heads of the first embodiment are fabricated using a method described below according to a second embodiment of the present invention. A flux guided MTJ structure is first deposited on a substrate, which can be a bottom shield. The flux guided MTJ structure includes a ferromagnetic free layer, a ferromagnetic pinned layer located above the ferromagnetic free layer, an insulating tunnel barrier layer located between the ferromagnetic pinned layer and the ferromagnetic free layer, an anti-ferromagnetic layer located on top of the ferromagnetic pinned layer, and a capping layer located on top of the anti-ferromagnetic layer. All layers of the flux guided MTJ layered structure are deposited sequentially by typical vacuum deposition techniques, such as ion beam deposition, RF or DC magnetron sputtering deposition, evaporation deposition, or MBE deposition. A photoresist mask is deposited on the flux guided MTJ structure to define the active region for the ferromagnetic pinned layer. The material of the layers of the MTJ layered structure in the unmasked regions is removed using subtractive techniques, such as ion beam milling, chemically-assisted ion beam milling, sputter etching and reactive ion etching, preferably ion beam milling, with the endpoint terminating above the insulating tunnel barrier layer.

In a preferred embodiment, the endpoint terminates within the ferromagnetic pinned layer. The remaining portion of the ferromagnetic pinned layer in the unmasked regions is rendered substantially non-conducting by chemical processing, such as oxidation, nitridization, or fluorination, and preferably oxidation, of the ferromagnetic material of this remaining portion. After the chemical processing, the milled, unmasked regions at both sides of the capping layer, the anti-ferromagnetic layer, and the ferromagnetic pinned layer are refilled with an insulating material. Chemical processing of the remaining portion of the ferromagnetic pinned layer in the unmasked regions is controlled. For example, when oxidation is used, the oxidation rates are typically between 1 Å/min and 5 Å/min.

Chemical processing of the non-active region of the ferromagnetic pinned layer is performed at a low rate so that the photoresist mask can survive the chemical processing. The photoresist mask is necessary in the subsequent deposition of the insulating material in the milled, unmasked regions.

Alternatively, the endpoint can terminate within the anti-ferromagnetic layer. In this case, the remaining portions of the anti-ferromagnetic layer and portions of the ferromagnetic pinned layer in the unmasked regions are rendered substantially non-conducting by chemical processing of the material of these portions. After chemical processing, the milled, unmasked regions at both sides of the capping layer and the anti-ferromagnetic layer are also refilled with an insulating material.

When the ferromagnetic pinned layer includes an AP pinned structure, the endpoint preferably terminates within the ferromagnetic pinned layer located further from the anti-ferromagnetic layer. The remaining portion of this ferromagnetic pinned layer is rendered substantially non-conducting by the chemical process.

A quantity of the insulating material is also deposited on the top and the sidewalls of the photoresist mask and is removed, along with the photoresist mask, in a liftoff process.

One advantage of the method of the present invention is that the rate of the chemical process of the non-active region of the ferromagnetic pinned layer is on the order of Å/min, which is controllable, instead of Å/sec. Therefore, a precise method to create the non-active region of the ferromagnetic pinned layer is now realizable. Furthermore, a key feature of this method is that the insulating tunnel barrier layer acts as a barrier to the chemical processing and therefore protects the ferromagnetic free layer from the chemical processing. In addition, another advantage of the method of the present invention is that the formation of the flux guide is achieved with an in-situ deposition of the MTJ layers.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
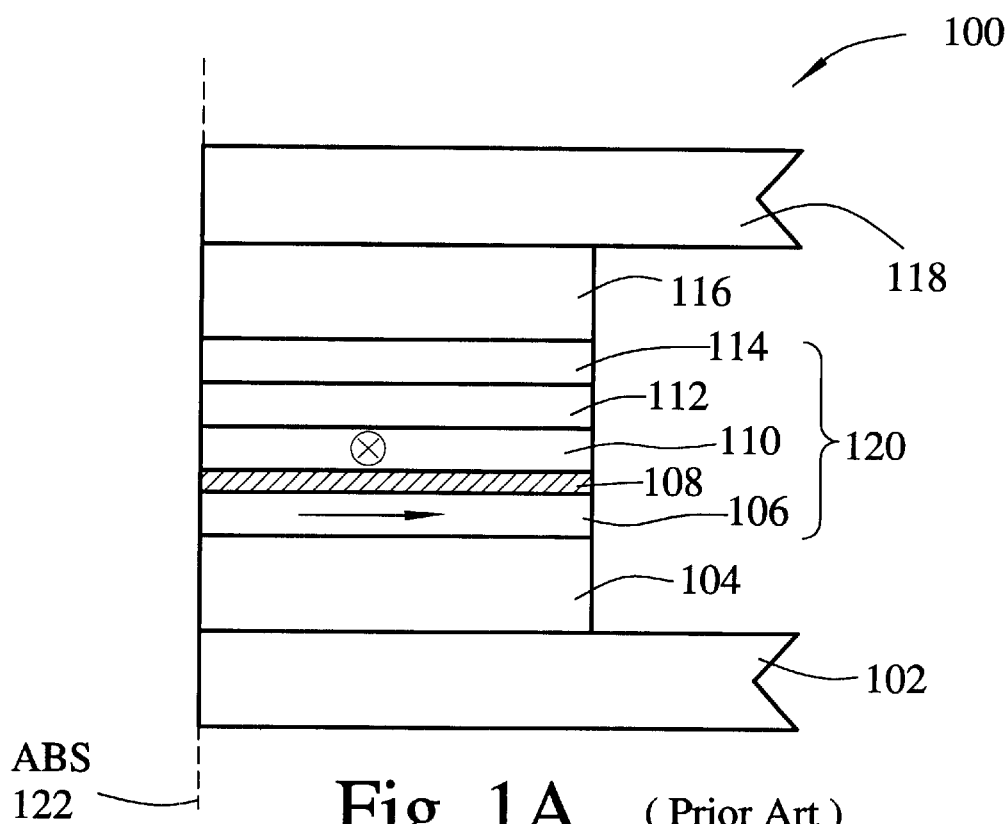
FIG. 1A is a sectional view of a basic magnetic tunnel junction head of the prior art.
Figure 1B:
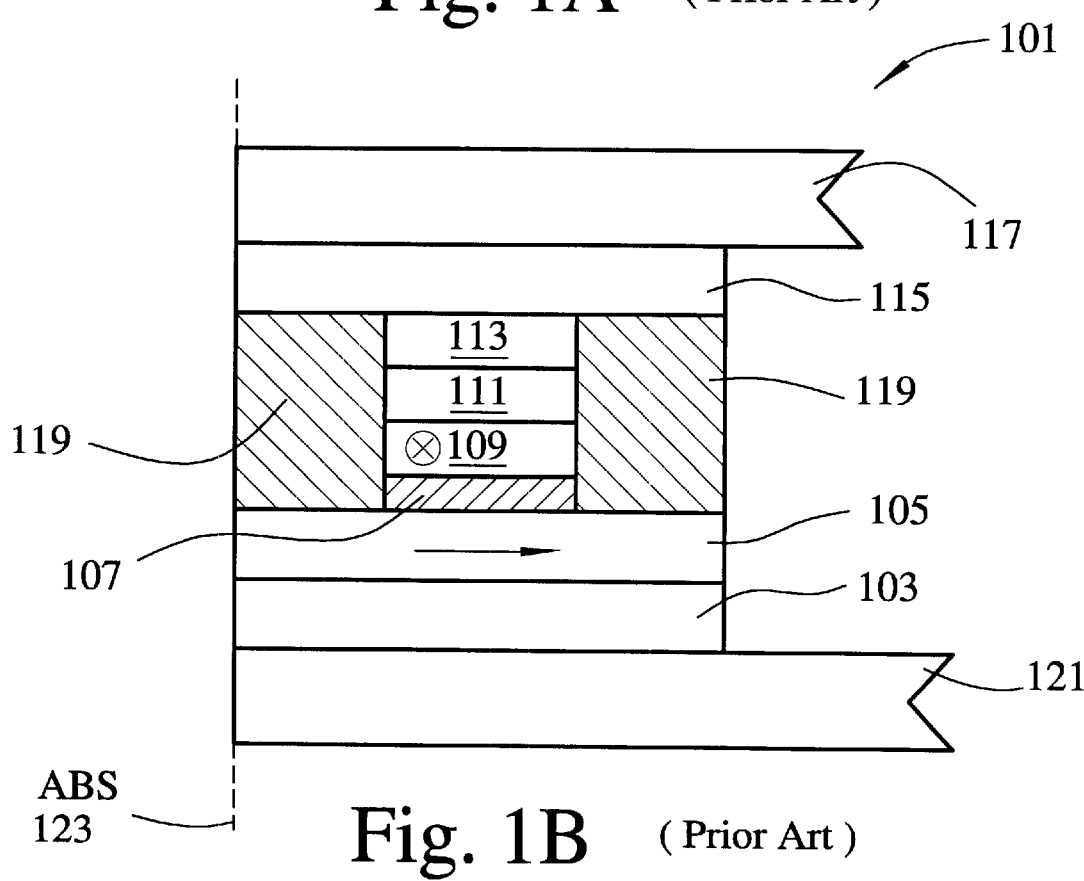
FIG. 1B is a sectional view of a flux guided magnetic tunnel head of the prior art.
Figure 2A:
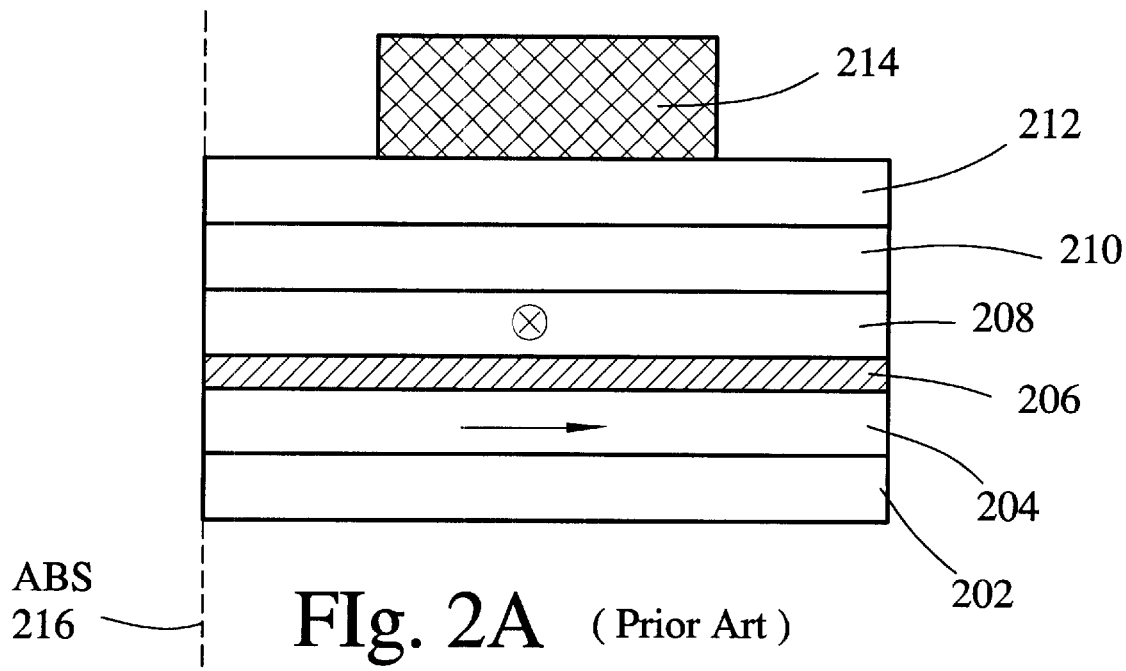
FIGS. 2A–2D are sectional views illustrating a series of steps for fabricating the flux guided magnetic tunnel junction head of FIG. 1B.
Figure 2B:
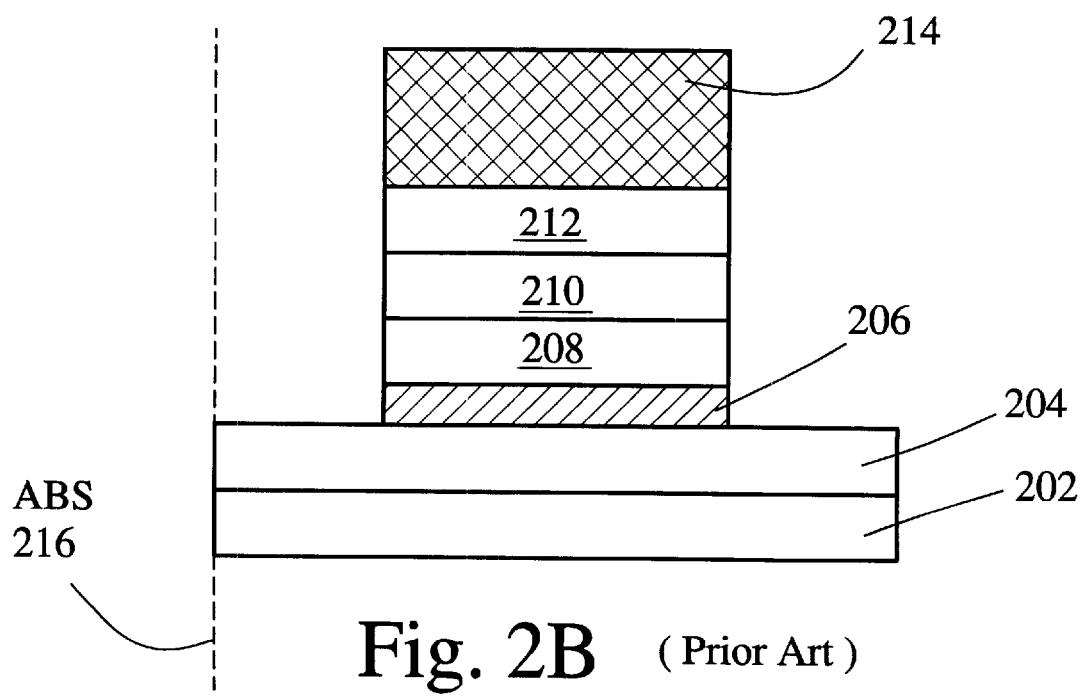
Figure 2C:
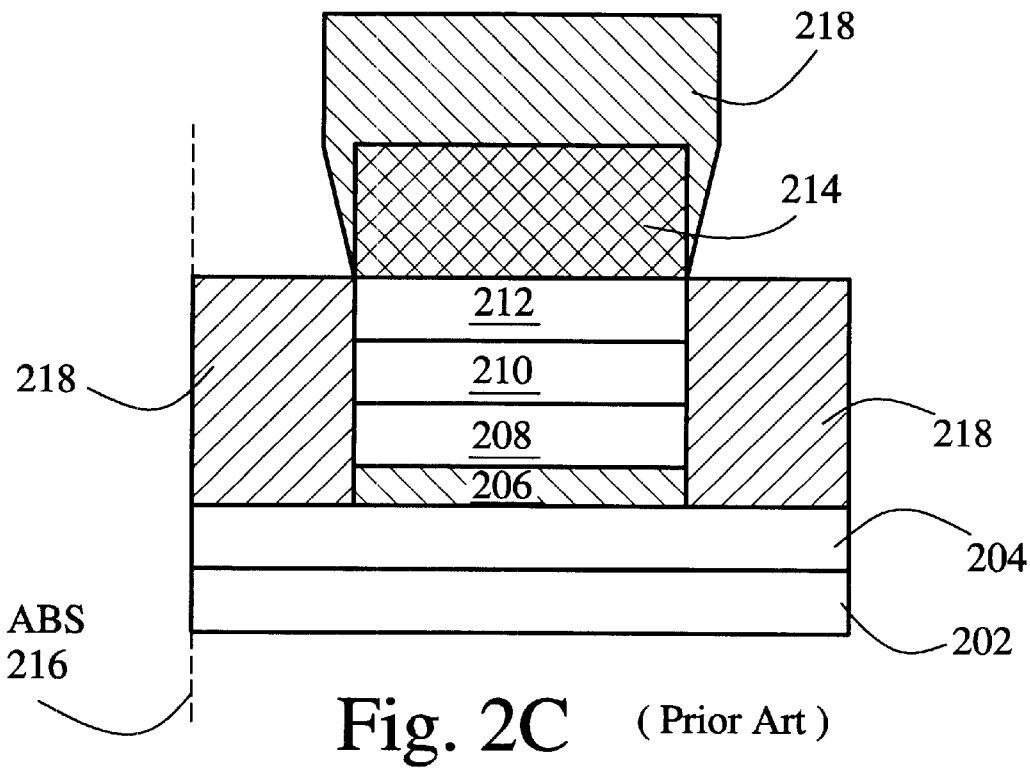
Figure 2D:
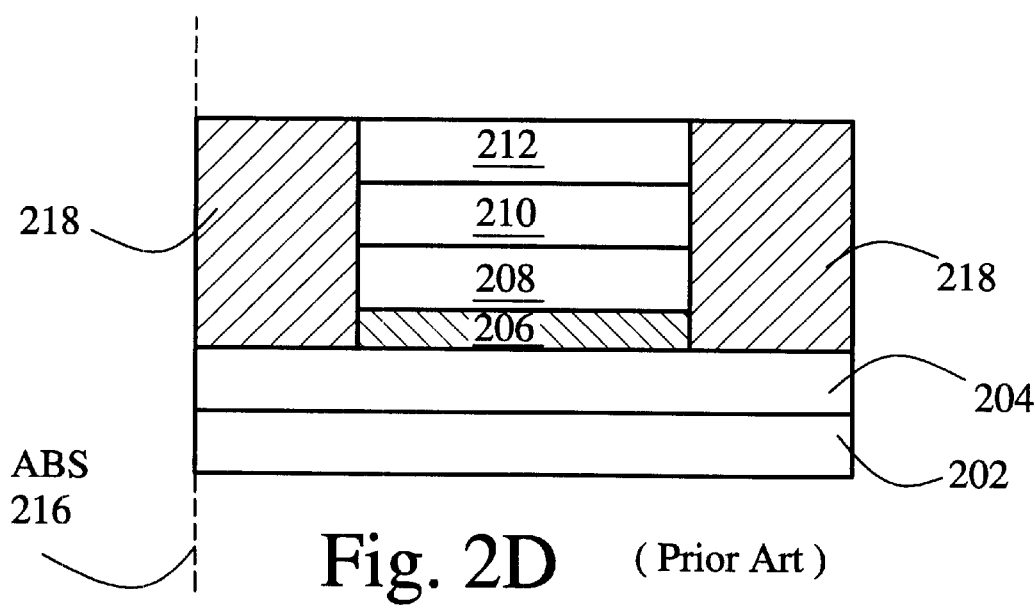
Figure 3A:
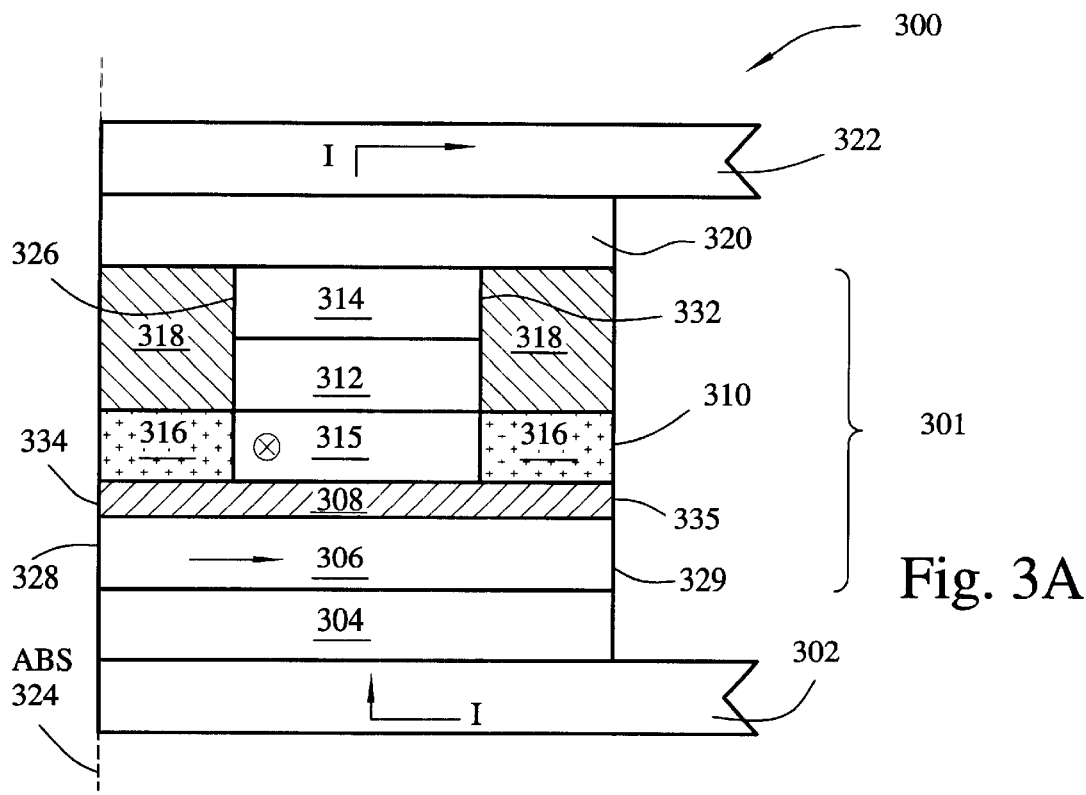
FIG. 3A is a sectional view of a flux guided magnetic tunnel junction head according to a first embodiment of the present invention.

A flux guided magnetic tunnel junction (MTJ) head 300 of the present invention is shown in the sectional view of FIG. 3A according to a first embodiment of the present invention. The flux guided MTJ head 300 includes a MTJ layered structure 301 sandwiched by a top electrically conductive lead 320 adjacent to a top shield 322 and a bottom electrically conductive lead 304 adjacent to a bottom shield 302. The MTJ layered structure 301 includes a ferromagnetic pinned layer 310 having a magnetic moment or magnetization direction prevented from rotation in the presence of an applied magnetic field by exchange coupling with an anti-ferromagnetic layer 312, a ferromagnetic free layer 306 having a magnetic moment free to rotate in the presence of the applied magnetic field, and an insulating tunnel barrier layer 308 disposed between the ferromagnetic free layer 306 and the ferromagnetic pinned layer 310. The MTJ layered structure 301 also includes a protective or capping layer 314 adjacent to the anti-ferromagnetic layer 312.

The ferromagnetic free layer 306 is about 30 Å–50 Å thick and typically contains Ni, Fe, Co or their alloys. Alternatively, the ferromagnetic free layer 306 can include an AP free structure containing two AP free layers sandwiching an AP spacer layer. The ferromagnetic pinned layer 310 is about 20 Å–50 Å thick and typically contains Co or CoFe. The ferromagnetic pinned layer can alternatively include an AP pinned structure containing two ferromagnetic pinned layers sandwiching a metal spacer layer. Each ferromagnetic pinned layer is about 20 Å–50 Å thick and typically contains Co or CoFe. The metal spacer layer is 4 Å–20 Å thick and typically contains Ru and its alloys.

The anti-ferromagnetic layer 312 is about 50 Å–200 Å thick and typically contains an alloy consisting of Mn, such as NiMn, IrMn, PtMn, or FeMn. The insulating tunnel barrier layer 308 is about 10 Å thick and typically contains $Al_2O_3$, AlN, and MgO or combinations of these materials, and the capping layer 314 is about 50 Å thick and typically contains of Ta. Two electrically conductive leads 304, 320 are typically made of conducting materials, such as Ta, Al, Au, W, Ru, Rh, Ti and Pt, with thicknesses between 20 Å and 200 Å. Two shields 302 and 322 are typically made of ferromagnetic material, such as NiFe, NiFeCo, FeN, and FeAlSi with thicknesses of 0.5 $\mu$m–3 $\mu$m.

The capping layer 314 and the anti-ferromagnetic layer 312 have coplanar front edges 326 and coplanar back edges 332. The front edges 326 are recessed from an air bearing surface (ABS) 324 and the back edges are located farther than the front edges 326 from the ABS 324. The regions 318 located at both sides of the capping layer 314 and the anti-ferromagnetic layer 312 consist of an insulating material, such as $Al_2O_3$. The ferromagnetic pinned layer 310 includes an active region 315 having a front edge substantially coplanar with the front edges 326, and a back edge substantially coplanar with the back edges 322, and the non-active regions 316 located on both sides of the active region 315. The non-active regions 316 of the ferromagnetic pinned layer 310 are non-conducting and are formed by chemical processing, such as oxidation, nitridization or fluorination, of the ferromagnetic material of the ferromagnetic pinned layer 310 in these regions. The non-active regions 316 are also preferably substantially non-magnetic (i.e., permeability $\mu$ approximately equal to 1).

Figure 3B:
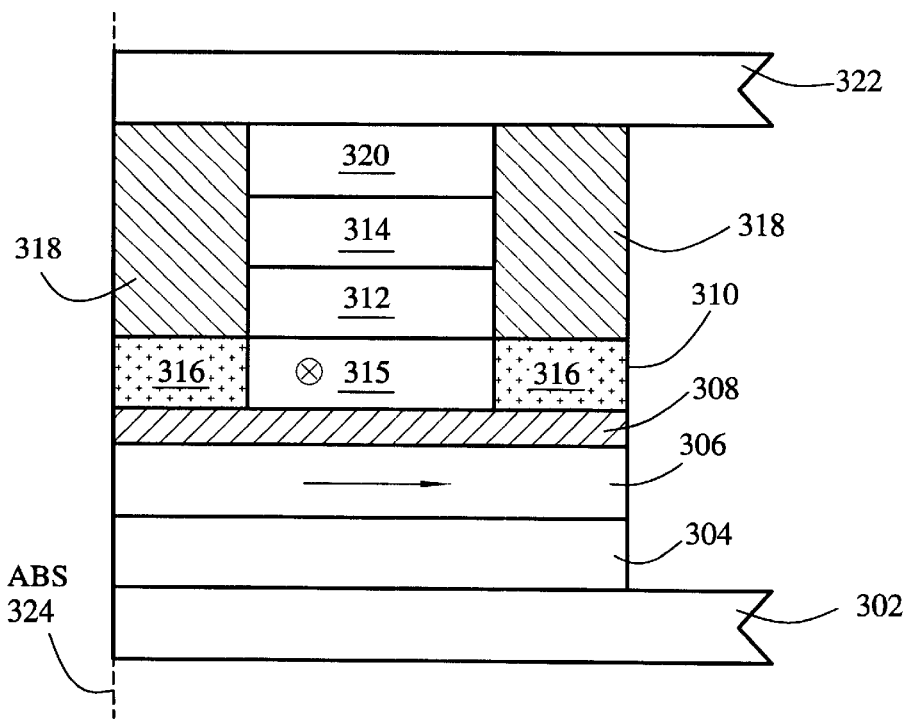
FIGS. 3B–E are sectional views of alternative flux guided magnetic tunnel junction heads of the present invention.
Figure 3C:
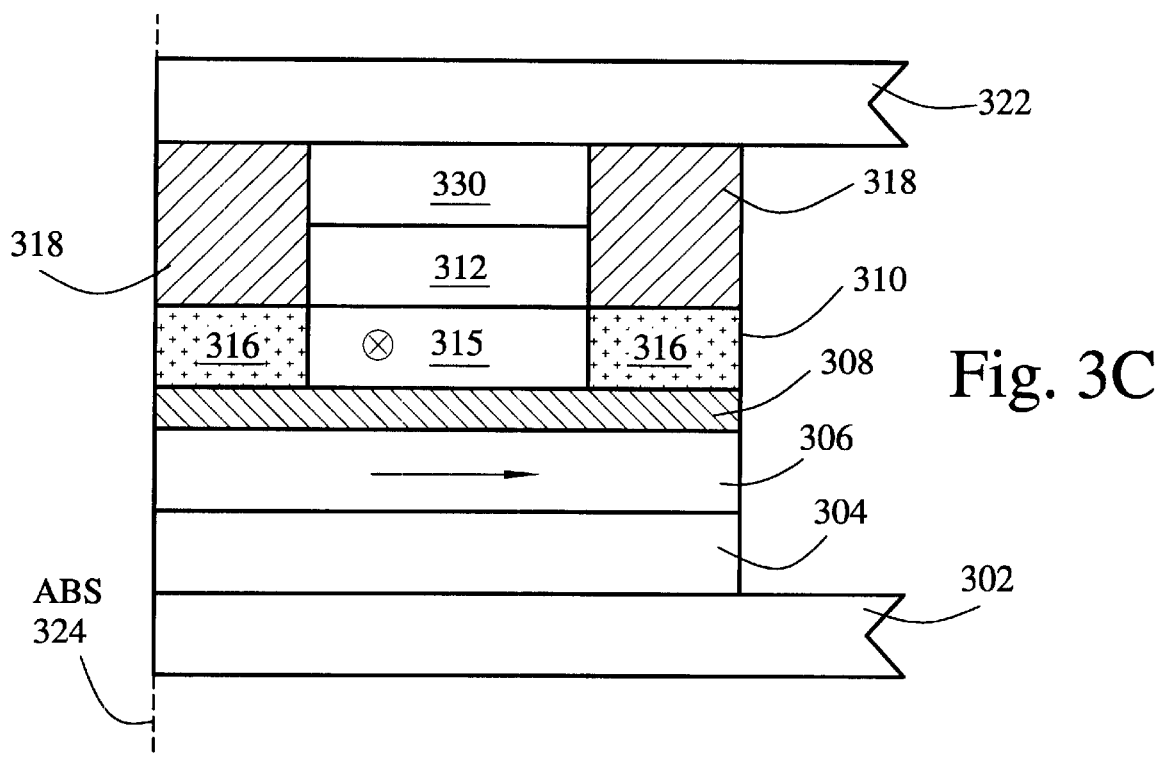

Alternatively, the top electrically conductive lead 320 can have a front edge recessed from the ABS 324 and coplanar with the front edges 326, and a back edge coplanar with the back edge 332 as shown in FIG. 3B. In addition, the top electrically conductive lead 320 and the capping layer 314 can be combined into one conductive layer 330 having a front edge recessed from the ABS 324 and coplanar with the front edges 326, and a back edge coplanar with the back edge 332 as shown in FIG. 3C.

Figure 3D:
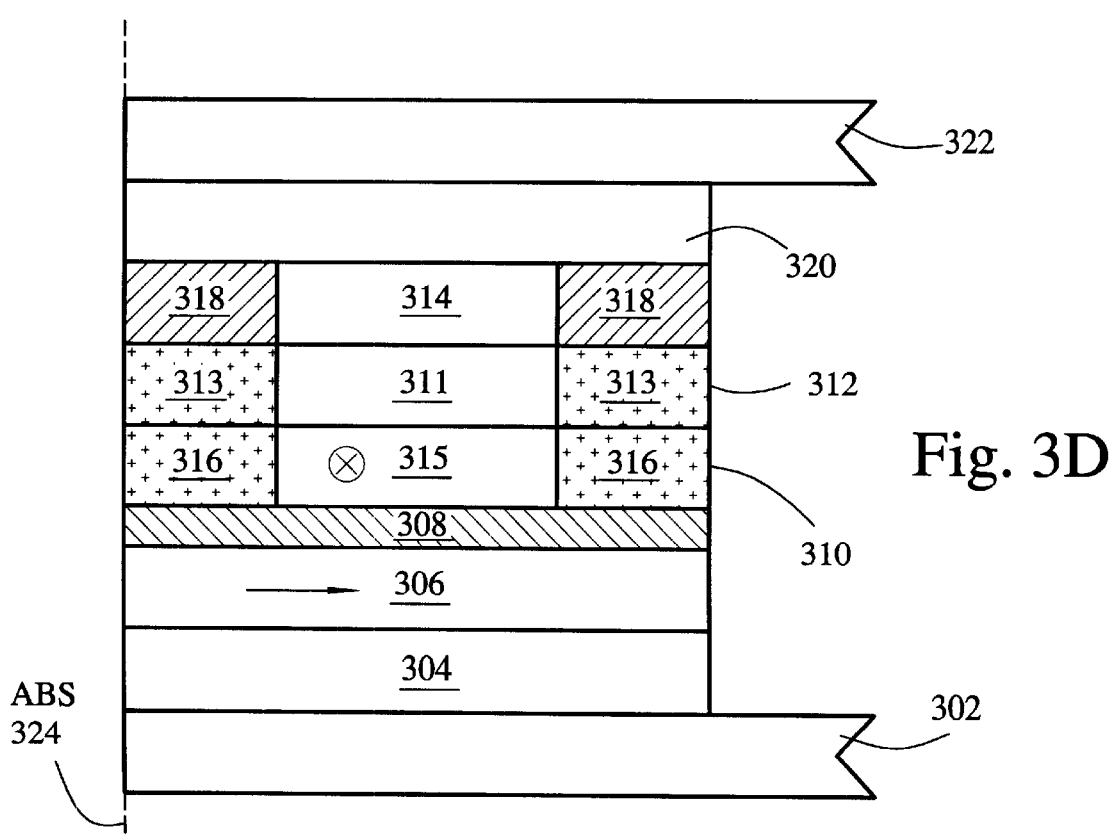

The anti-ferromagnetic layer 312 alternatively includes an active region 311 and non-active regions 313 as shown in FIG. 3D. Similar to the non-active regions 316 of the ferromagnetic pinned layer 310 shown in FIG. 3A, the non-active regions 313 are non-conducting and substantially non-magnetic and are formed by chemically processing the anti-ferromagnetic material in these regions.

Figure 3E:
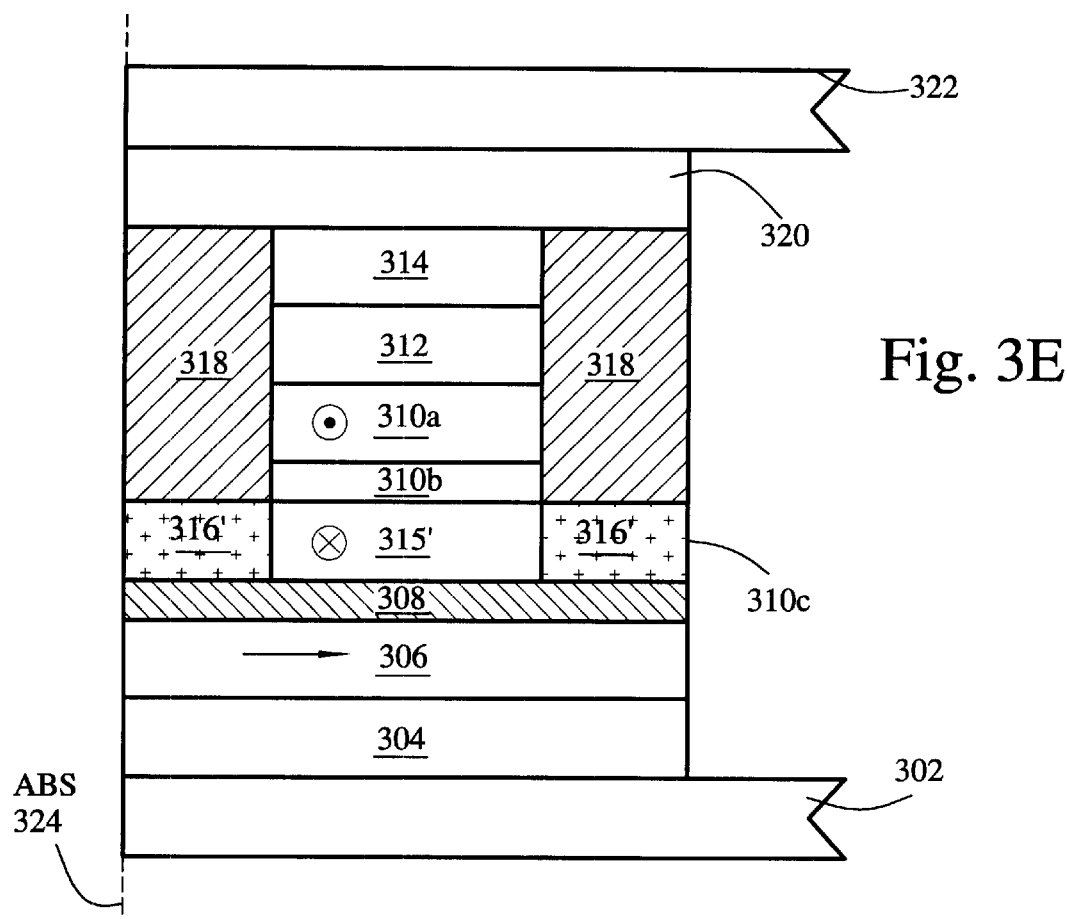

As discussed above, the ferromagnetic pinned layer 310 can include an AP pinned structure as shown in FIG. 3E. The AP pinned structure includes a first ferromagnetic pinned layer 310a, a second ferromagnetic pinned layer 310c, and a metal spacer layer 310b between the first and second ferromagnetic pinned layers 310a and 310c. The first ferromagnetic pinned layer 310a and the metal spacer layer 310b have front edges recessed from the ABS 324. The second ferromagnetic pinned layer 310c includes an active region 315' and non-active regions 316'. Similar to the non-active regions 316 shown in FIG. 3A, the non-active regions 316' are non-conducting and preferably substantially non-magnetic and are formed by chemically processing the ferromagnetic material in these regions.

As shown in FIG. 3A, the ferromagnetic free layer 306 has a front edge 328 substantially coplanar with the ABS 324 and a back edge 329 located farther than the back edges 332 from the ABS 324. Therefore, the ferromagnetic free layer 306 can function as a flux guide to direct magnetic flux from a magnetic recording medium to the tunnel junction. The tunneling barrier layer 308 also has a front edge 334 substantially coplanar with the sensing surface 324 and a back edge 335 coplanar with the back edge 329.

As shown in FIG. 3A, a sense current I is directed from the bottom shield 302, through the bottom electrically conductive lead 304, perpendicularly through the MTJ layered structure 301, through the top electrical conductive lead 320 and then out through the top shield 322. The location of the front edge 326 of the active region 315 of the ferromagnetic pinned layer 310 prevents any shorting of the MTJ structure 301 that may occur when the head is lapped at the sensing surface 324. In addition, since the front edges 326 of the anti-ferromagnetic layer 312 and the capping layer 314 are recessed from the sensing surface 324, these layers are not exposed and thus are less likely to experience corrosion.

The flux guided magnetic tunnel junction head of the first embodiment is fabricated using a method shown in FIGS. 4A–4F according to a second embodiment of the present invention.

Figure 4A:
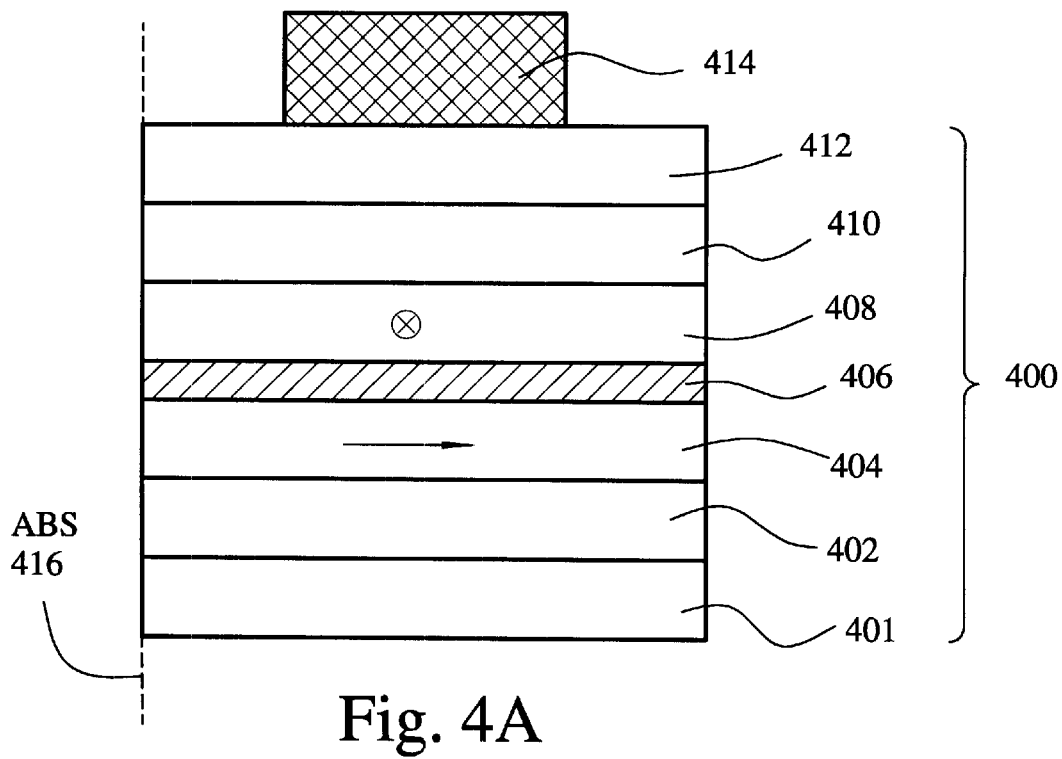
FIGS. 4A–4F are sectional views illustrating a series of steps for fabricating the flux guided magnetic tunnel junction head of FIG. 3A according to a second embodiment of the present invention.

As shown in FIG. 4A, a magnetic tunnel junction layered structure 400 is first provided. The magnetic tunnel junction layered structure 400 is produced by depositing a bottom electrically conductive lead 402 on the bottom shield 401, a ferromagnetic free layer 404 on the bottom electrical conductive lead 402, an insulating tunnel barrier layer 406 on the ferromagnetic free layer 404, a ferromagnetic pinned layer 408 on the insulating tunnel barrier layer 406, an anti-ferromagnetic layer 410 on the ferromagnetic pinned layer 408, and a capping layer 412 on the anti-ferromagnetic layer 410. All layers of the magnetic tunnel junction layered structure 400 are preferably deposited by typical vacuum deposition techniques, such as ion beam deposition, RF or DC magnetron sputtering deposition, evaporation deposition, or MBE deposition. The magnetic tunnel junction layered structure 400 is then patterned using a photoresist mask 414 to define an active region 408' of the ferromagnetic pinned layer 408 (shown in FIG. 4B). The materials in the unmasked regions 418 of the capping layer 412 and the anti-ferromagnetic layer 410 are removed from the ABS 416 using subtractive techniques, such as ion beam milling, chemically-assisted ion beam milling, sputter etching, or reactive ion etching, with the endpoint terminating above the insulating tunnel barrier layer 406.

Figure 4B:
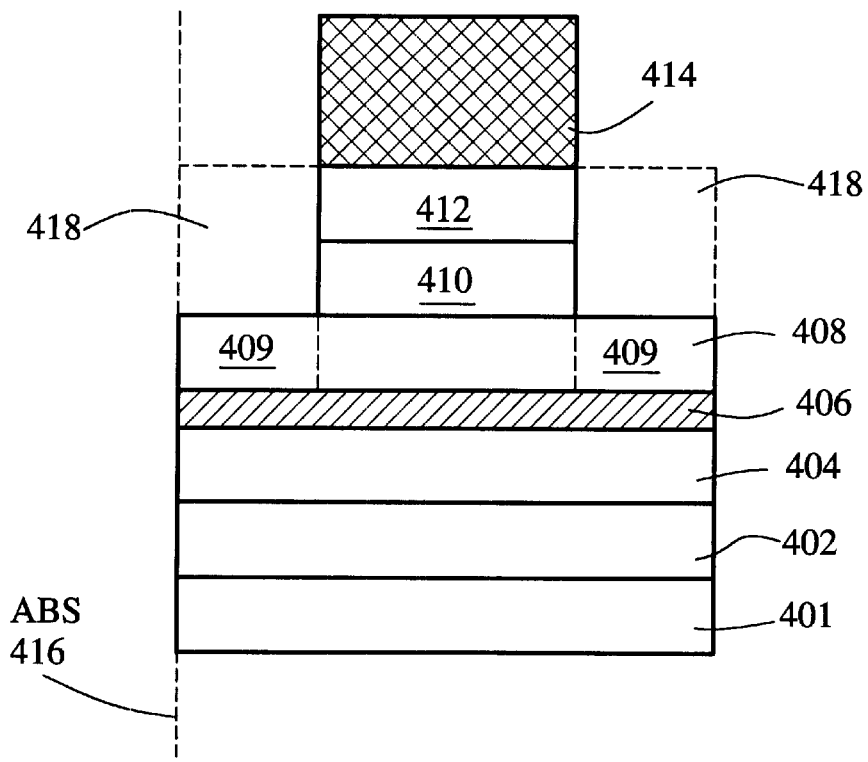
Figure 4C:
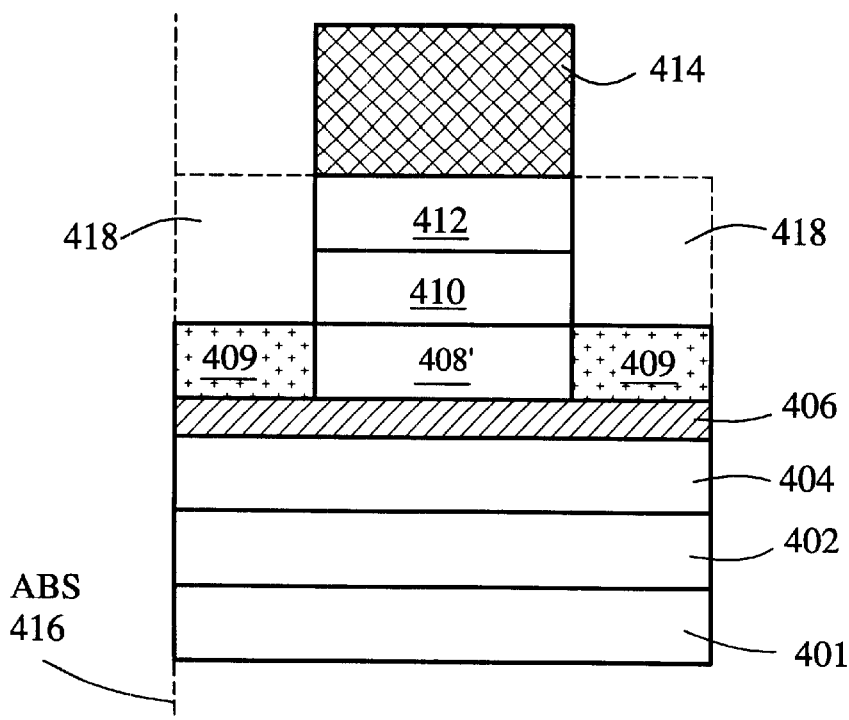

In a preferred embodiment, ion beam milling is used to remove the materials in the unmasked regions 418 of the capping layer 412 and the anti-ferromagnetic layer 410, with the endpoint terminating within the ferromagnetic pinned layer 408. FIG. 4B shows the endpoint of ion beam milling terminating at the top surface of the ferromagnetic pinned layer 408. The exposed ferromagnetic material of the remainder of the ferromagnetic pinned layer 408 in the unmasked regions 409 is then rendered substantially non-conducting using chemical processing, such as oxidation, nitridization, or fluorination, so that these regions become non-active, as shown in FIG. 4C. An additional benefit of the chemical process is that it renders the non-active regions 409 substantially non-magnetic as well (i.e., permeability $\mu$ approximately equal to 1).

Alternatively, the ion beam milling endpoint can terminate within the anti-ferromagnetic layer 410, and the remainders of the anti-ferromagnetic layer 410 and the ferromagnetic pinned layer 408 in the unmasked regions are rendered substantially non-conducting using a chemical process as described above.

In addition, when the ferromagnetic layer 408 includes an AP pinned structure, the ion beam milling endpoint preferably terminates within the ferromagnetic pinned layer located farther from the anti-ferromagnetic layer 410 (e.g., ferromagnetic pinned layer 310c of FIG. 3E). The remainder of this ferromagnetic pinned layer in the unmasked regions is then rendered substantially non-conducting using a chemical process as described above.

In a preferred embodiment, oxidation is used to reduce the electrically conductivity of the non-active regions 409 to substantially non-conducting. The oxidation process is preferably done using plasma, but can also be done by other techniques, such as thermal (air) oxidation or using an ion source. The oxidation of the unmasked or non-active regions 409 of the ferromagnetic pinned layer 408 is controlled, with controllable oxidation rates between 1 Å/min and 5 Å/min. This process reduces the electrical conductivity of the non-active regions 409 to substantially non-conducting, so that the non-active regions 409 cannot conduct significant current. In addition, the oxidation may reduce the magnetic moment of the non-active regions 409 to near zero at room temperature, so that these regions also cannot conduct flux. The low oxidation rate also prevents consumption of the photoresist mask 414, which is necessary in the subsequent deposition of the insulating material in the unmasked regions 418 in a later step. The insulating tunnel barrier layer 406 acts as a barrier to oxidation and therefore protects the ferromagnetic free layer 404 from the oxidation.

Figure 4D:
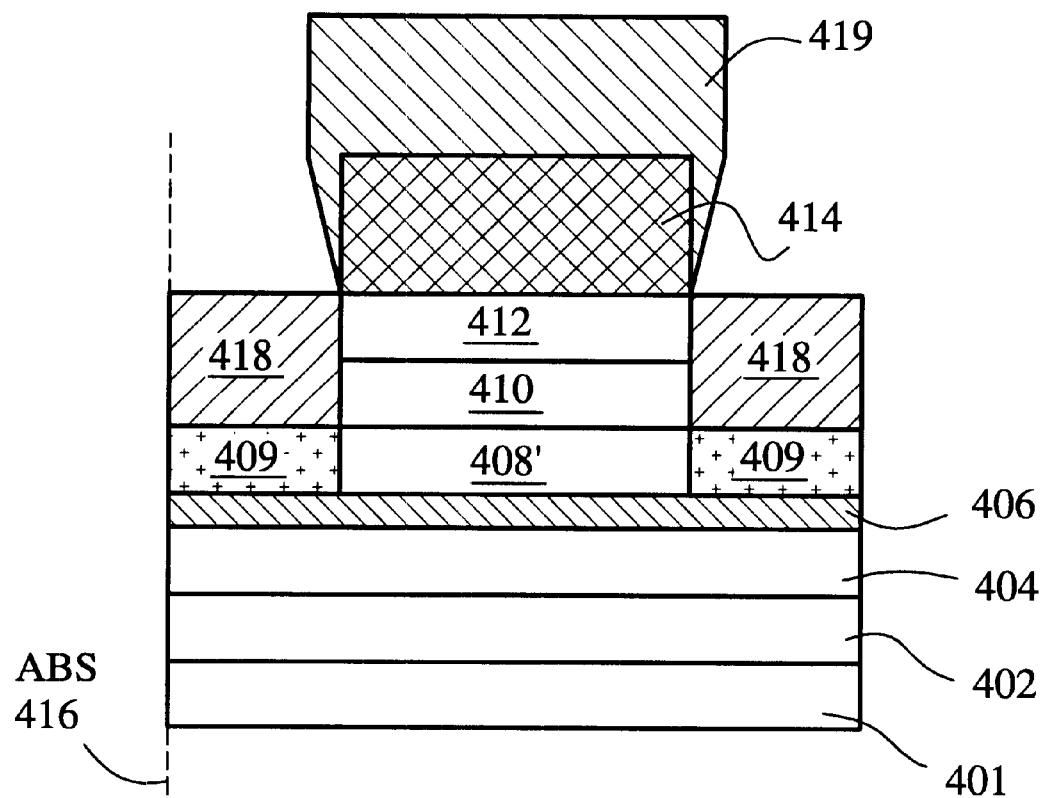
Figure 4E:
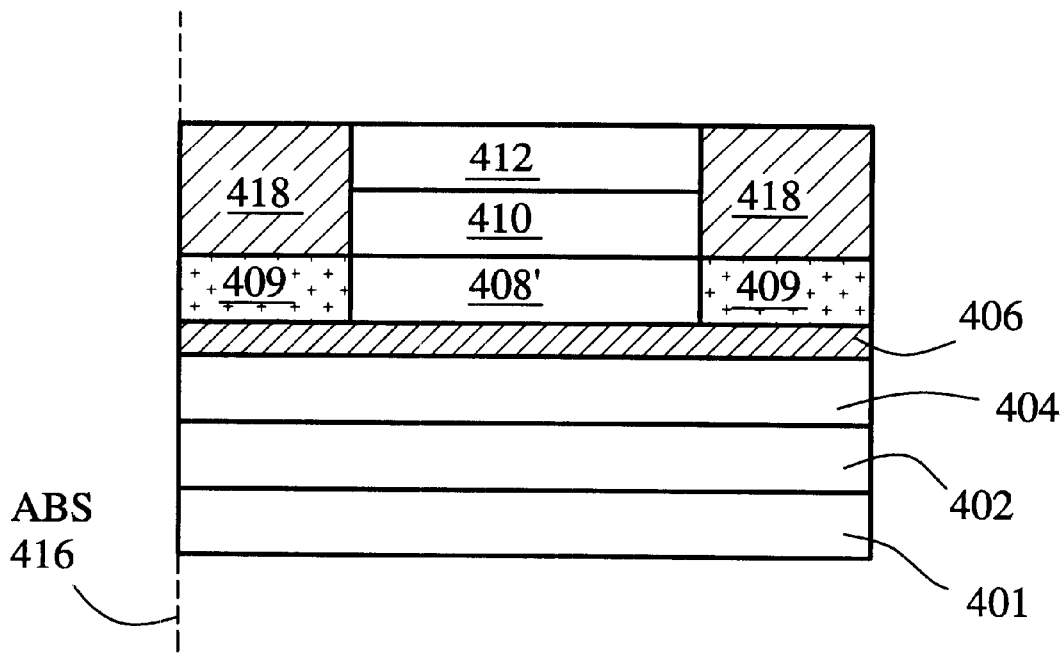

After the successful chemical processing of the non-active regions 409, the unmasked regions 418 are filled with an insulating material, such as alumina, to seal the edges of the capping layer 412 and the anti-ferromagnetic layer 410, as shown in FIG. 4D. The deposition of the insulating material in the unmasked regions 418 can be done using typical vacuum deposition techniques, such as ion beam deposition, RF or DC magnetron sputtering deposition, evaporation deposition, or MBE deposition. As shown in FIG. 4D, a quantity of insulating material 419 is also deposited onto the top and sidewalls of the photoresist mask 414. However, this quantity of material is removed along with the photoresist mask 414 in the liftoff process, resulting in a structure as shown in FIG. 4E.

Figure 4F:
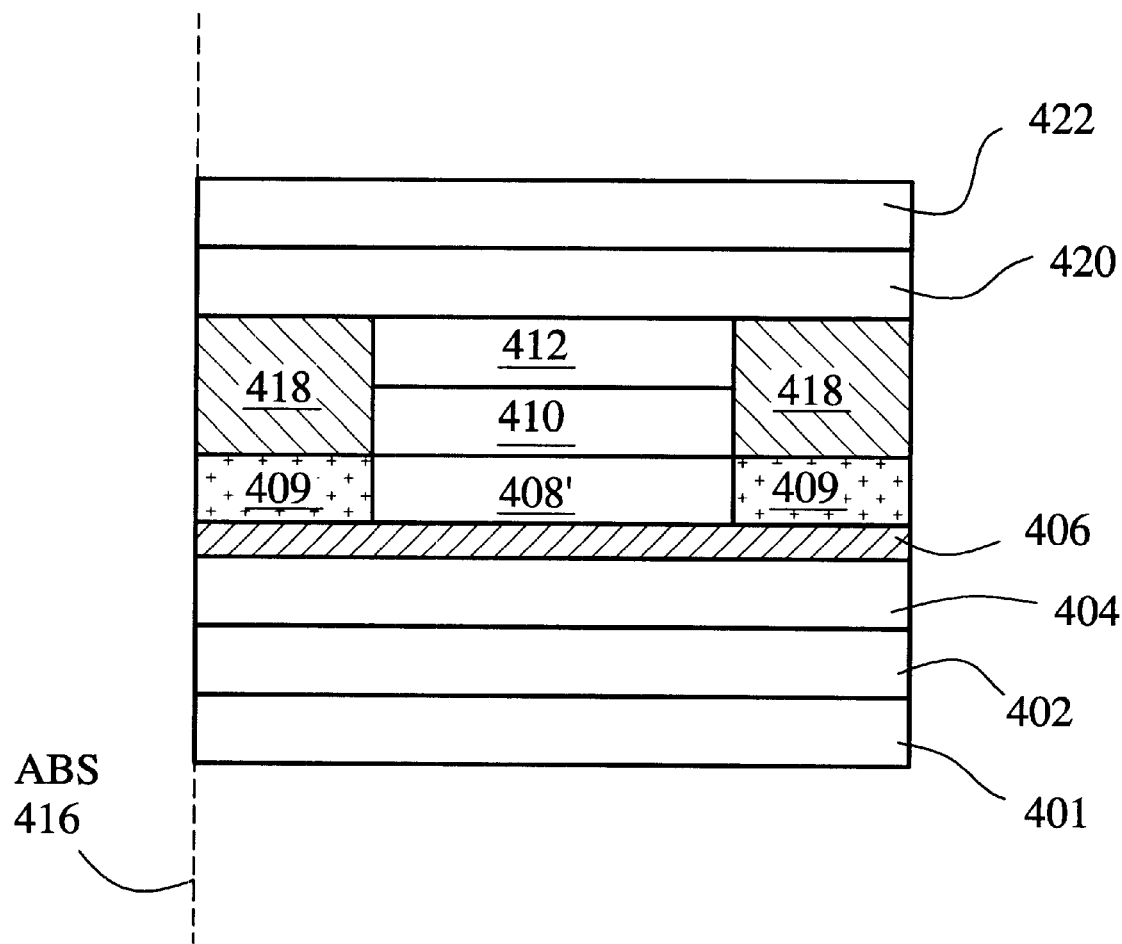

As shown in FIG. 4F, after the deposition of the insulating material in the unmasked regions 418, a top electrically conductive lead 420 is deposited on the capping layer 412, and a top shield 422 is deposited on the top electrically conductive lead 420. The deposition of the top electrically conductive lead 420 and the top shield 422 are also done by typical vacuum deposition techniques, such as ion beam deposition, RF or DC magnetron sputtering deposition, evaporation deposition, or MBE deposition. The top electrically conductive lead 420 can instead be deposited on the capping layer 412 before depositing the photoresist mask 414 as shown in FIG. 4A so that the material in the unmasked regions of the top electrically conductive lead 420 is removed from the ABS 416 by the subtractive technique. Alternatively, a conductive layer functioning as a capping layer and a top electrically conductive layer is deposited on the anti-ferromagnetic layer 410 before the photoresist mask 414 is deposited so that the material in the unmasked regions of this conductive layer is removed from the ABS 416 by the subtractive technique.

Figure 5:
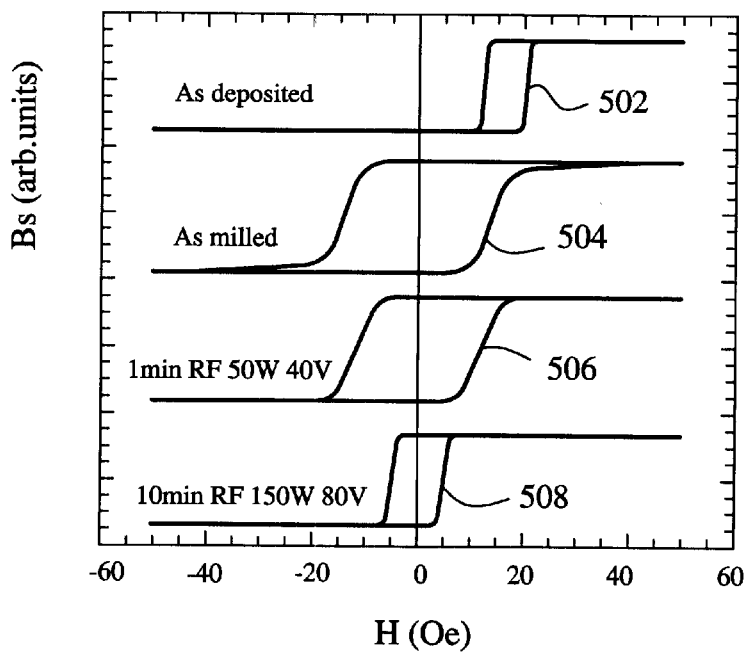
FIG. 5 is a graph showing a sequence of B-H loop plots of the magnetic tunnel junction structure at various stages of the oxidation process.

FIG. 5 shows a sequence of B-H hysteresis loops of a flux guided MTJ head at various stages of the process. A B-H hysteresis loop illustrates the energy loss, involved in magnetizing and demagnetizing a ferromagnetic substance, per unit volume of specimen. Loop 502 is a B-H loop of the MTJ layered structure as deposited. B-H loop 502 shows that the coercive field of the ferromagnetic free layer is shifted by the coupling field from the ferromagnetic pinned layer. The magnetic moment contribution from the ferromagnetic pinned layer cannot be seen because the coercivity is shifted to higher field by the anti-ferromagnetic layer.

Loop 504 is a B-H loop of the MTJ structure after the ion beam milling in the unmasked regions of the capping layer and the anti-ferromagnetic layer, but before the oxidation of the unmasked regions of the ferromagnetic pinned layer. B-H loop 504 shows no coupling field from the anti-ferromagnetic layer, since this layer has been removed; a larger magnetic moment, which reflects the magnetic moment contribution from the ferromagnetic pinned layer; and an increased coercive field due to the high coercivity of the ferromagnetic pinned layer and the interlayer coupling between the ferromagnetic free layer and the ferromagnetic pinned layer.

Loop 506 is a B-H loop of the MTJ structure after one minute of oxidation of the non-active regions of the ferromagnetic pinned layer. The B-H loop 506 shows that the magnetic moment and the coercive field of the ferromagnetic free layer are reduced, consistent with a reduction of the magnetic contribution of the ferromagnetic pinned layer.

Loop 508 is a B-H loop of the MTJ structure with complete oxidation for 10 minutes. B-H loop 508 shows a small magnetic moment representing only the ferromagnetic free layer and a low coercive field due to the absence of the magnetic moment contribution from the ferromagnetic pinned layer. The absence of the magnetic moment contribution from the ferromagnetic pinned layer signifies the conversion of the non-active regions of this layer to oxidized regions, demonstrating that these non-active regions are non-magnetic and most likely non-conducting because oxides of Fe and Co alloy are generally non-conducting or weakly conducting.

An advantage of the method of the present invention is that the formation of the flux guide is achieved with an in-situ deposition of the MTJ layers (i.e., the MTJ layers are sequentially deposited without vacuum interruptions). Another advantage of this method is that the rate for chemically processing the ferromagnetic material in the non-active regions of the ferromagnetic pinned layer is on the order of Å/min, which is controllable, instead of the Å/sec rate. A precise method to create the non-active regions of the ferromagnetic pinned layer is realizable.

Figure 6:
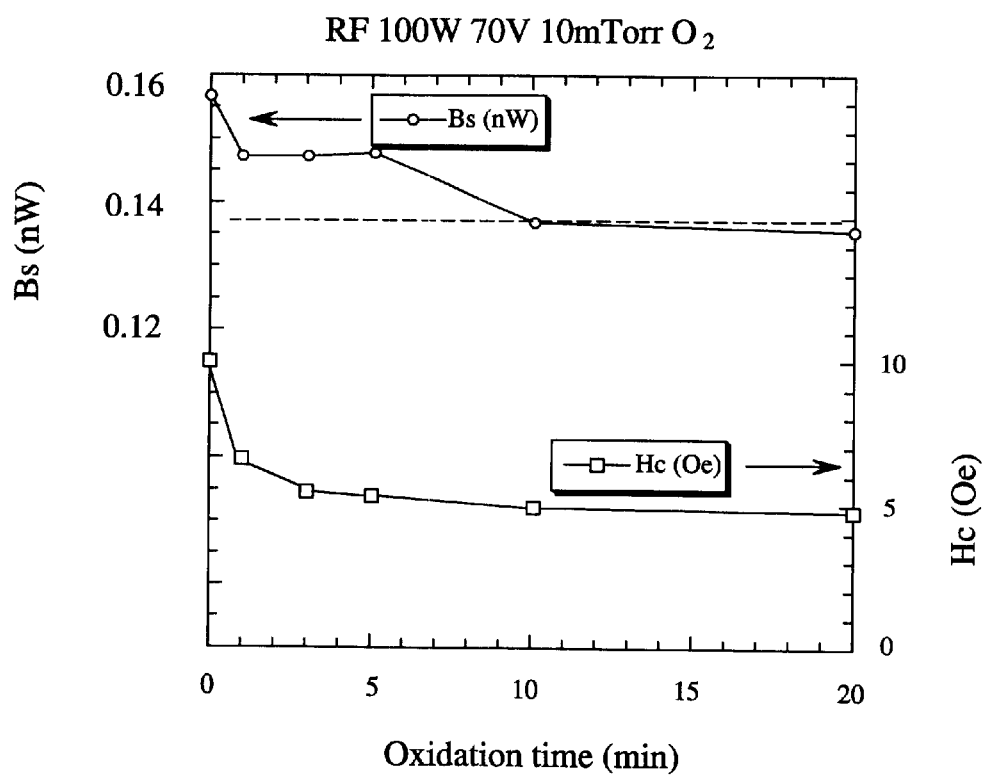
FIG. 6 is a graph showing plots of the saturation magnetic flux Bs and the coercive field Hc of the magnetic tunnel junction structure as functions of oxidation time.

In addition, a key feature of this method is the self-limiting aspect of the chemical processing due to the tunnel barrier layer acting as a barrier that protects the ferromagnetic free layer from chemical processing, which is illustrated in FIG. 6. FIG. 6 is a graph showing the saturation magnetic flux Bs and the coercive field Hc as functions of oxidation time after the ion beam milling using a 100W RF plasma with a 70V DC bias on the substrate in 10 mTorr of oxygen. As shown in FIG. 6, Bs reduces in the initial stage of oxidation due to the oxidation of the non-active regions of the ferromagnetic pinned layer. After 10 minutes of the oxidation, the ferromagnetic pinned layer is fully oxidized, and the magnetization Bs reaches the level expected from the ferromagnetic free layer only (dashed line). No further decrease of the magnetization Bs is observed upon increasing the oxidation time to 20 minutes, indicating a limitation of the oxidation process due to the tunnel barrier effectively protecting the ferromagnetic free layer. Additionally shown in FIG. 6, the coercivity Hc of the ferromagnetic free layer decreases in the initial stage of oxidation, and reaches a constant value after 10 minutes of oxidation, indicating that the ferromagnetic free layer remains unoxidized.

Figure 7:
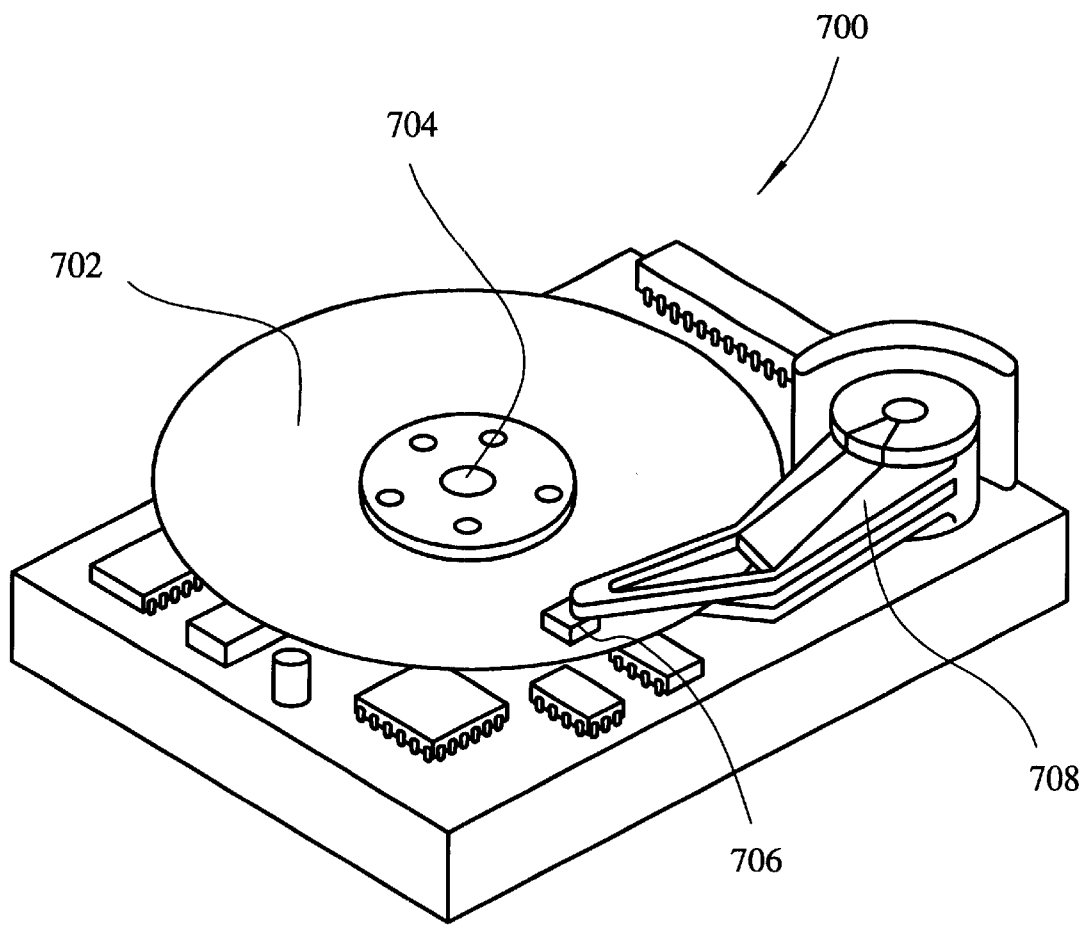
FIG. 7 is an isometric view of a magnetic recording system including the flux guided magnetic tunnel junction head of FIG. 3.

The flux guided MTJ head of the type depicted in FIG. 3 may be incorporated into a disk drive 700 as shown in FIG. 7 according to a third embodiment of the present invention. Disk drive 700 includes a magnetic recording disk 702 connected to a motor 704 and a flux guided MTJ head 706 connected to an actuator 708. The motor 704 spins the magnetic recording disk 702 with respect to the flux guided MTJ head 706. The actuator 708 moves the flux guided MTJ head 706 across the magnetic recording disk 702 so the flux guided MTJ head 706 may access different regions of magnetically recorded data on the magnetic recording disk 702.

It will be clear to one skilled in the art that the above embodiments may be altered in many ways without departing from the scope of the invention. Accordingly, the scope of the invention should be determined by the following claims and their legal equivalents.

What is claimed is:

1. A flux guided magnetic tunnel junction head comprising:
    a) a ferromagnetic pinned layer having an active region and a non-active region, the active region including a front edge recessed from a sensing surface, the non-active region being located between the active region and the sensing surface and being formed by chemical processing of the ferromagnetic material to render it non-conducting;
    b) a ferromagnetic free layer having a front edge substantially coplanar with the sensing surface;

c) an insulating tunnel barrier layer located between the ferromagnetic pinned and ferromagnetic free layers; and d) an anti-ferromagnetic layer in proximity to the ferromagnetic pinned layer.

2. The flux guided magnetic tunnel junction head of claim 1, wherein the insulating tunnel barrier layer has a front edge substantially coplanar with the sensing surface.

3. The flux guided magnetic tunnel junction head of claim 1, wherein the anti-ferromagnetic layer comprises an active region and a non-active region, the active region including a front edge recessed from the sensing surface, the non-active region being located between the active region and the sensing surface and being formed by chemically processing the anti-ferromagnetic material.

4. The flux guided magnetic tunnel junction head of claim 1, wherein the anti-ferromagnetic layer has a front edge recessed from the sensing surface.

5. The flux guided magnetic tunnel junction head of claim 1, wherein the non-active region of the ferromagnetic pinned layer is formed by oxidizing material in this region.

6. The flux guided magnetic tunnel junction head of claim 1, wherein the non-active region of the ferromagnetic pinned layer is formed by nitridizing material in this region.

7. The flux guided magnetic tunnel junction head of claim 1, wherein the non-active region of the ferromagnetic pinned layer is formed by fluorinating material in this region.

8. The flux guided magnetic tunnel junction head of claim 1 further comprising a capping layer adjacent to the anti-ferromagnetic layer, the capping layer having a front edge recessed from the sensing surface.

9. The flux guided magnetic tunnel junction head of claim 8 further comprising a top electrically conductive lead adjacent to the capping layer.

10. The flux guided magnetic tunnel junction head of claim 9, wherein the top electrically conductive lead has a front edge recessed from the sensing surface.

11. The flux guided magnetic tunnel junction head of claim 1, wherein the non-active region of the ferromagnetic pinned layer is substantially non-magnetic.

12. The flux guided magnetic tunnel junction head of claim 1, wherein the ferromagnetic pinned layer comprises an anti-parallel pinned structure.

13. The flux guided magnetic tunnel junction head of claim 12, wherein anti-parallel pinned structure comprises first and second ferromagnetic pinned layers sandwiching a metal spacer layer.

14. The flux guided magnetic tunnel junction head of claim 1, wherein the non-active region of the ferromagnetic pinned layer comprises an oxidation product of the active region of the ferromagnetic pinned layer.

15. The flux guided magnetic tunnel junction head of claim 1, wherein the non-active region of the ferromagnetic pinned layer comprises a nitridization product of the active region of the ferromagnetic pinned layer.

16. The flux guided magnetic tunnel junction head of claim 1, wherein the non-active region of the ferromagnetic pinned layer comprises a fluorination product of the active region of the ferromagnetic pinned layer.

17. The flux guided magnetic tunnel junction head of claim 1, wherein the ferromagnetic pinned layer comprises Co and the non-active region of the ferromagnetic pinned layer comprises an oxidation product of Co.

18. The flux guided magnetic tunnel junction head of claim 1, wherein the ferromagnetic pinned layer comprises CoFe and the non-active region of the ferromagnetic pinned layer comprises an oxidation product of CoFe.

19. The flux guided magnetic tunnel junction head of claim 1, wherein the ferromagnetic pinned layer comprises Co and the non-active region of the ferromagnetic pinned layer comprises a nitrization product of Co.

20. The flux guided magnetic tunnel junction head of claim 1, wherein the ferromagnetic pinned layer comprises CoFe and the non-active region of the ferromagnetic pinned layer comprises a nitridization product of CoFe.

21. The flux guided magnetic tunnel junction head of claim 1, wherein the ferromagnetic pinned layer comprises Co and the non-active region of the ferromagnetic pinned layer comprises a fluorination product of Co.

22. The flux guided magnetic tunnel junction head of claim 1, wherein the ferromagnetic pinned layer comprises CoFe and the non-active region of the ferromagnetic pinned layer comprises a fluorination product of CoFe.

23. A disk drive comprising:

a) a magnetic recording disk;

b) a flux guided magnetic tunnel junction head supported on a slider for magnetically reading or writing data from the magnetic recording disk;

c) an actuator connected to the slider for moving the magnetic tunnel junction head across the magnetic recording disk; and d) a mechanism for moving the magnetic recording disk relative to the flux guided magnetic tunnel junction head;

wherein the flux guided magnetic tunnel junction head includes:

i) a ferromagnetic pinned layer having an active region and a non-active region, the active region including a front edge recessed from a sensing surface, the non-active region being located between the active region and the sensing surface and being formed by chemically processing the ferromagnetic material to render it non-conducting;

ii) a ferromagnetic free layer having a front edge substantially coplanar with the sensing surface;

iii) an insulating tunnel barrier layer disposed between the ferromagnetic pinned and ferromagnetic free layers; and iv) an anti-ferromagnetic layer in proximity to the ferromagnetic pinned layer.

24. The disk drive of the claim 23, wherein the insulating tunnel barrier layer has a front edge substantially coplanar with the sensing surface.

25. The disk drive of claim 23, wherein the anti-ferromagnetic layer comprises an active region and a non-active region, the active region including a front edge recessed from a sensing surface, the non-active region being located between the active region and the sensing surface and being formed by chemical processing of the anti-ferromagnetic material.

26. The disk drive of claim 23, wherein the anti-ferromagnetic layer has a front edge recessed from the sensing surface.

27. The disk drive of claim 23, wherein the flux guided magnetic tunnel junction head further comprises a capping layer adjacent to the anti-ferromagnetic layer, the capping layer having a front edge recessed from the sensing surface.

28. The disk drive of claim 23, wherein the ferromagnetic pinned layer comprises an anti-parallel pinned structure.

29. The disk drive of claim 28, wherein the anti-parallel pinned structure comprises first and second ferromagnetic pinned layers sandwiching a metal spacer layer.

* * * * *